United States Patent [19]
Saito et al.

[11] Patent Number: 5,841,393
[45] Date of Patent: Nov. 24, 1998

[54] FAILURE DETERMINATION DEVICE OF RADAR APPARATUS

[75] Inventors: Tamio Saito, Kawasaki; Osamu Isaji, Kobe, both of Japan

[73] Assignees: Fujitsu Limited, Kawasaki; Fujitsu Ten Limited, Kobe, both of Japan

[21] Appl. No.: 814,408

[22] Filed: Mar. 11, 1997

[30] Foreign Application Priority Data

Aug. 16, 1996 [JP] Japan .................................. 8-216216

[51] Int. Cl.$^6$ ....................................................... G01S 7/40
[52] U.S. Cl. ............................................................ 342/165
[58] Field of Search ................................... 342/165, 166, 342/167, 168, 169, 170, 171, 172, 173, 174, 70, 71, 72, 109, 112, 128, 200

[56] References Cited

U.S. PATENT DOCUMENTS 3,932,870 1/1976 Shapiro et al. ......................... 342/173
4,245,221 1/1981 Kipp et al. .

FOREIGN PATENT DOCUMENTS 0 527 443 2/1993 European Pat. Off. .
2 428 878 1/1980 France .
2 303 011 5/1997 United Kingdom .

OTHER PUBLICATIONS

Patent Abstracts of Japan, vol. 18, No. 175 (Dec. 24, 1993).
Patent Abstracts of Japan, vol. 18, No. 295 (Mar. 4, 1994).
G. Trummer, "A Compact Radar Altimeter for Military and Civial Applications"; *Proceedings of the MM Conference*, No. 9 (Oct. 14, 1992).

*Primary Examiner*—Daniel T. Pihulic
*Attorney, Agent, or Firm*—Staas & Halsey

[57] ABSTRACT

A high frequency signal, which is produced in a oscillator, is modulated by a frequency from a modulating signal generated by a modulation signal generator and radiated from a sending antenna. A reflected signal from a target object is received by a receiving antenna, and frequency-converted by a local oscillating signal from a directional coupler in the frequency convertor. Then, distance and speed information is detected by a signal processing unit. A modulator, which is connected to the oscillator, modulates the oscillator output in order to detect a failure. A detection unit, in which a filter unit, a rectification circuit, and a voltage comparison circuit are included, detects modulated elements originated in the above described modulator. The signal processing unit makes a failure determination based on the modulated elements which have already been detected.

30 Claims, 18 Drawing Sheets

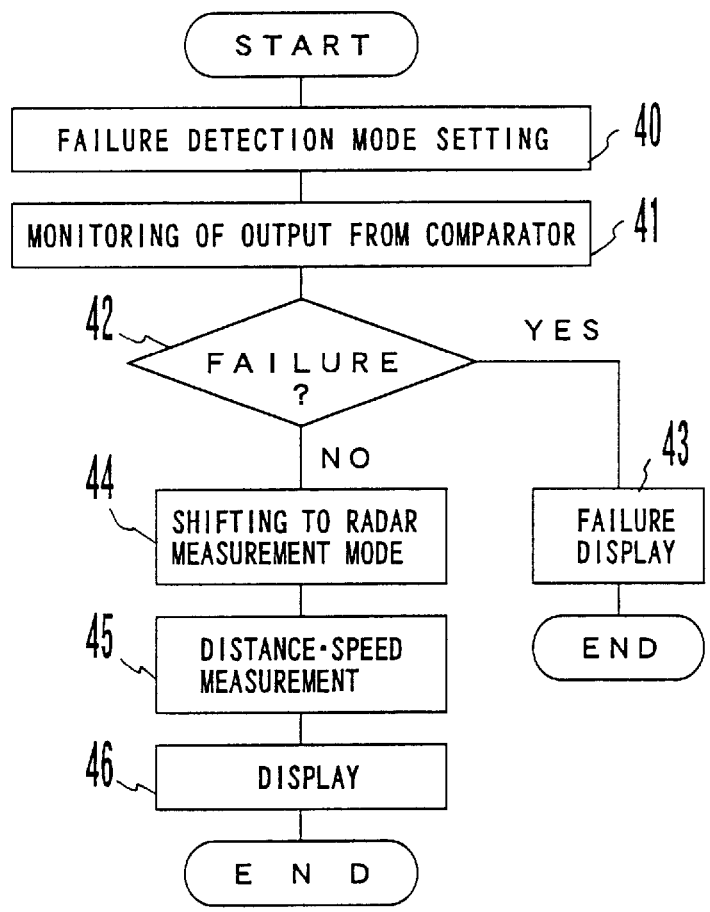
F I G. 1 1

FAILURE DETERMINATION DEVICE OF RADAR APPARATUS

BACKGROUND OF THE INVENTION

1. Field of the Invention

This invention relates to an FM-CW (Frequency Modulated Continuous Wave) radar apparatus which transmits a high frequency signal modulated (FM modulated) by a modulation signal. It receives a reflected signal back from a target object, and converts the received reflected signal, by using a signal which is obtained by splitting a part of the sending signal as a local oscillation signal for a receiver. More particularly the FM-CW radar apparatus is installed in a vehicle, which is preferably used to avoid a collision by calculating relative speed and distance from a target object.

2. Description of the Related Art

Recently, the number of accidents such as a vehicle collision shows a tendency to increase year by year as the number of vehicles on the roads increases. Thus, a safety device, such as a monitoring system between vehicles to obtain information about a collision in advance in order to decrease the number of vehicle collision accidents, should be installed in the vehicles at a low cost.

Up to now, an FM-CW radar system (frequency modulation continuous wave radar system) is used as a radar system which can measure the relative speed and distance to a target object. This radar system can measure the relative speed and distance by a simple signal processing circuit, and can realize a sending/receiving apparatus at a low cost, so that this system has been used as a collision avoidance radar system for a vehicle.

In FIGS. 1 and 2, an operating principle of the FM-CW radar system is shown. In FIG. 3, a conventional FM-CW radar apparatus is illustrated. Next, the principle of the FM-CW radar system will be explained below.

As shown in FIG. 3, an oscillating signal outputted by an oscillator 2 is FM-modulated by a sawtooth wave of several hundreds of Hz provided from a modulation signal generator 1, and the FM modulated wave is transmitted from a sending antenna 5. Then, a reflected signal from the target object is received by a receiving antenna 6, and is input to a frequency convertor 7, such as a mixer. The frequency convertor 7 detects, as an FM detector, the above described received signal by utilizing the FM modulated wave outputted from the oscillator 2 as a local oscillation signal. As a result, the reflected wave from the target object produces a frequency shift (beat) from the sending signal as shown in FIGS. 1 and 2, according to the distance between the radar system and the target object and on the Doppler shift based on the relative speed. This beat frequency element fb is represented by (distance frequency fr depending on the distance)±(speed frequency fd depending on the speed). Therefore, the distance and the relative speed can be measured based on the frequency shift.

Here, the following well-known equations are shown.

$$fr = (4\Delta\Omega T/c)R$$
$$fd = (2f_0/c)v \qquad (1)$$

Where; $\Delta\Omega$ is a modulation width; T is a modulation wave period; c is the speed of light; R is a distance from the obstacle (target object); $f_0$ is a sending central frequency; v is a relative speed of the obstacle (target object).

When this method is used as a mounted radar system, a modulation wave period should be set to be approximately $1\times10^{-3}$ s (second) and the modulation width should be set to be approximately 100 MHz in order to get sufficient distance measurement accuracy, since the measurement distance is 100 m (meter) at the most, and the relative speed may be 100 km/h (kilo meter/hour). Further, a millimeter wave band should be used as a sending frequency band in order to get sufficient relative speed measurement accuracy. For example, when the modulation wave period is $1.33\times10^3$ s, the modulation width is 75 MHz, and the sending frequency is 60 GHz, distance resolving power becomes 1 m and speed resolving power becomes 6.75 km/h.

As a method for detecting a failure in a high frequency circuit of the radar system according to the conventional FM-CW radar, the method has been considered in which a failure is detected by monitoring current values or voltage values applied to parts of each high frequency circuit.

However, there is a problem in that it is difficult to detect performance deterioration and abnormal operation resulting from a circuit characteristic degradation, etc., because the amount of change in the voltage and current value is very small, although complete failure (destruction) can be detected according to the method for detecting the failure by monitoring the current and voltage values.

SUMMARY OF THE INVENTION

The object of the present invention is to provide an FM-CW radar apparatus at a low price which is able to detect abnormal operation and a performance deterioration based on the characteristic deterioration of a high frequency circuit.

The present invention is based on a failure determination device of a radar apparatus which transmits a high frequency signal modulated by a modulation signal, receives a reflected signal from a target object, and converts the aforementioned received reflected signal by using a signal which is split from the sending signal as a local oscillation signal of a receiver.

Further, the present invention includes a modulator for modulating the local oscillation signal input to a receiving system circuit, a detection circuit for detecting frequency elements originated in that modulator, and a failure determination circuit for making a failure determination based on the frequency elements detected by the detection circuit.

According to the present invention, it becomes possible to detect the abnormal operation and the performance deterioration based on the characteristic deterioration of the high frequency circuit before the radar apparatus fails completely.

BRIEF DESCRIPTION OF THE DRAWINGS

The present invention will be more apparent from the following detailed description in conjunction with the accompanying drawings, in which:

FIG. 11 is an operating flowchart showing CPU (Central Processing Unit) processing of the present invention;

DESCRIPTION OF THE PREFERRED EMBODIMENT

Here, each preferred embodiment of the present invention is explained in detail by referring to the figures.
<Explanation of the Principle of the Preferred Embodiment>

Initially, the principle of each preferred embodiment will be explained. Then, each preferred embodiment based on the present invention will be explained in detail.

Figure 4:
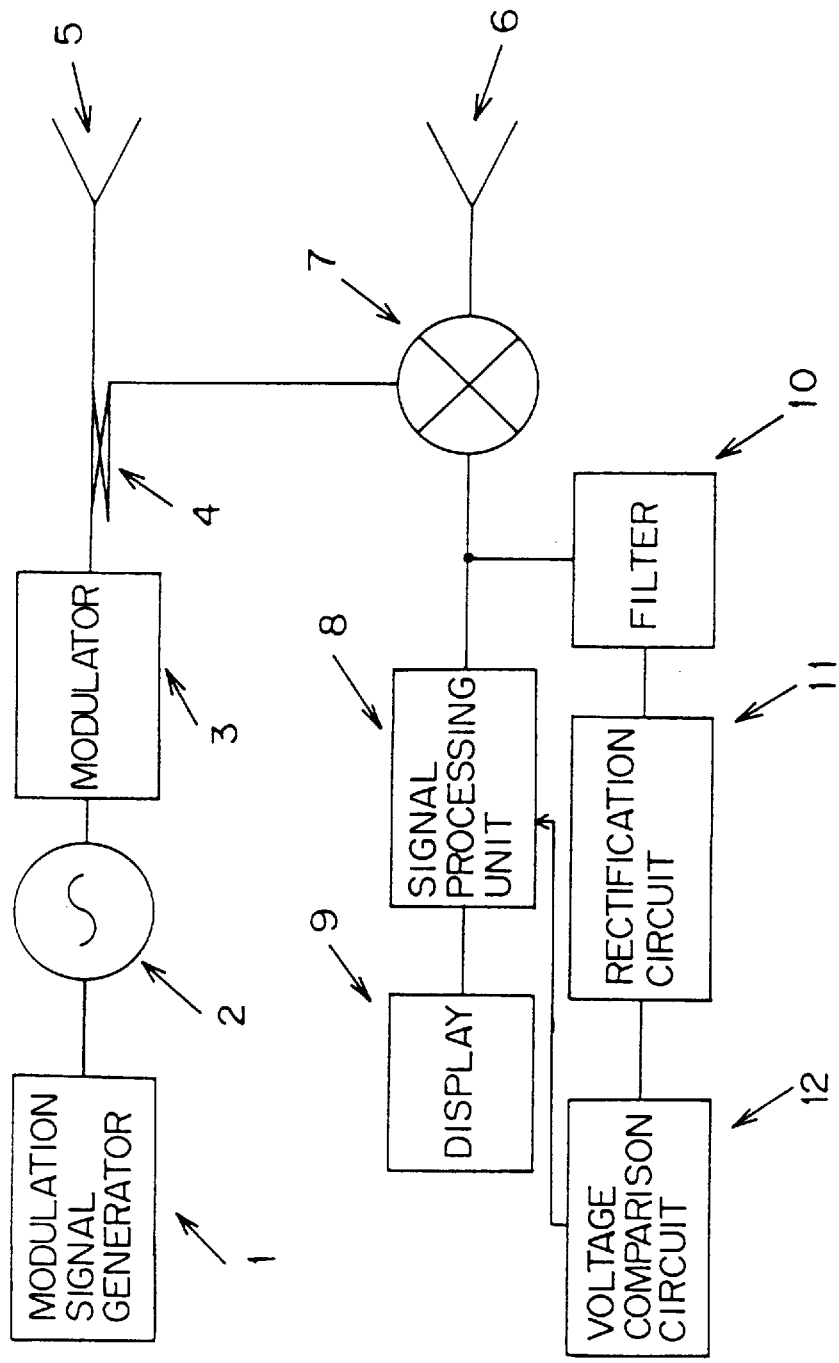
FIG. 4 is a block diagram of the principle of the first embodiment of the present invention.

FIG. 4 is a block diagram of the first embodiment of the present invention.

A modulation signal generator 1 generates a sawtooth wave signal for frequency modulation (FM modulation).

A voltage controlled oscillator 2 generates the signal to be modulated in the millimeter wave band which is output from the radar system.

A modulator 3 operates the modulation for detecting a failure.

A directional coupler 4 splits the signal from the voltage controlled oscillator 2 to the sending signal for the sending antenna 5 and the local oscillation signal for a frequency convertor 7.

A sending antenna 5 efficiently radiates the frequency modulated signal output from the voltage controlled oscillator 2.

The receiving antenna 6 efficiently receives the signal reflected from a target object.

The frequency convertor 7 mixes the local oscillation signal from the directional coupler 4 and the reflected signal from the target object which is received by the receiving antenna 6, and generates the signal elements containing the relative speed and the distance information between the target object and the radar apparatus.

A signal processing unit 8 detects the relative speed and the distance information from the signal elements output from the frequency convertor 7, and outputs data necessary for display to a display 9.

The display 9 displays the display data output from the signal processing unit 8.

A filter 10 has the band width in which only the modulated frequency, for checking the operation in a high frequency circuit system in the radar apparatus, can pass.

A rectification circuit 11 outputs the modulated signal to a voltage comparison circuit 12 by converting it to a direct current signal.

The voltage comparison circuit 12 compares a reference level which is previously set with a detection level of the signal detected in the high frequency circuit system, and sends an alarm signal to a CPU (not shown in this figure), when the detected level becomes lower than the reference level.

In the above described first embodiment of the present invention, the modulator 3 corresponds to the modulator recited in claim 2. The filter 10, the rectification circuit 11, and the voltage comparison circuit 12 correspond to the detection circuit recited in claim 2, and the signal processing unit 8 corresponds to the failure determination circuit recited in claim 2.

By realizing the above described first embodiment of the present invention, a performance deterioration and an abnormal operation resulting from the characteristic deterioration of a high frequency circuit can be detected before the radar apparatus fails completely.

Figure 5:
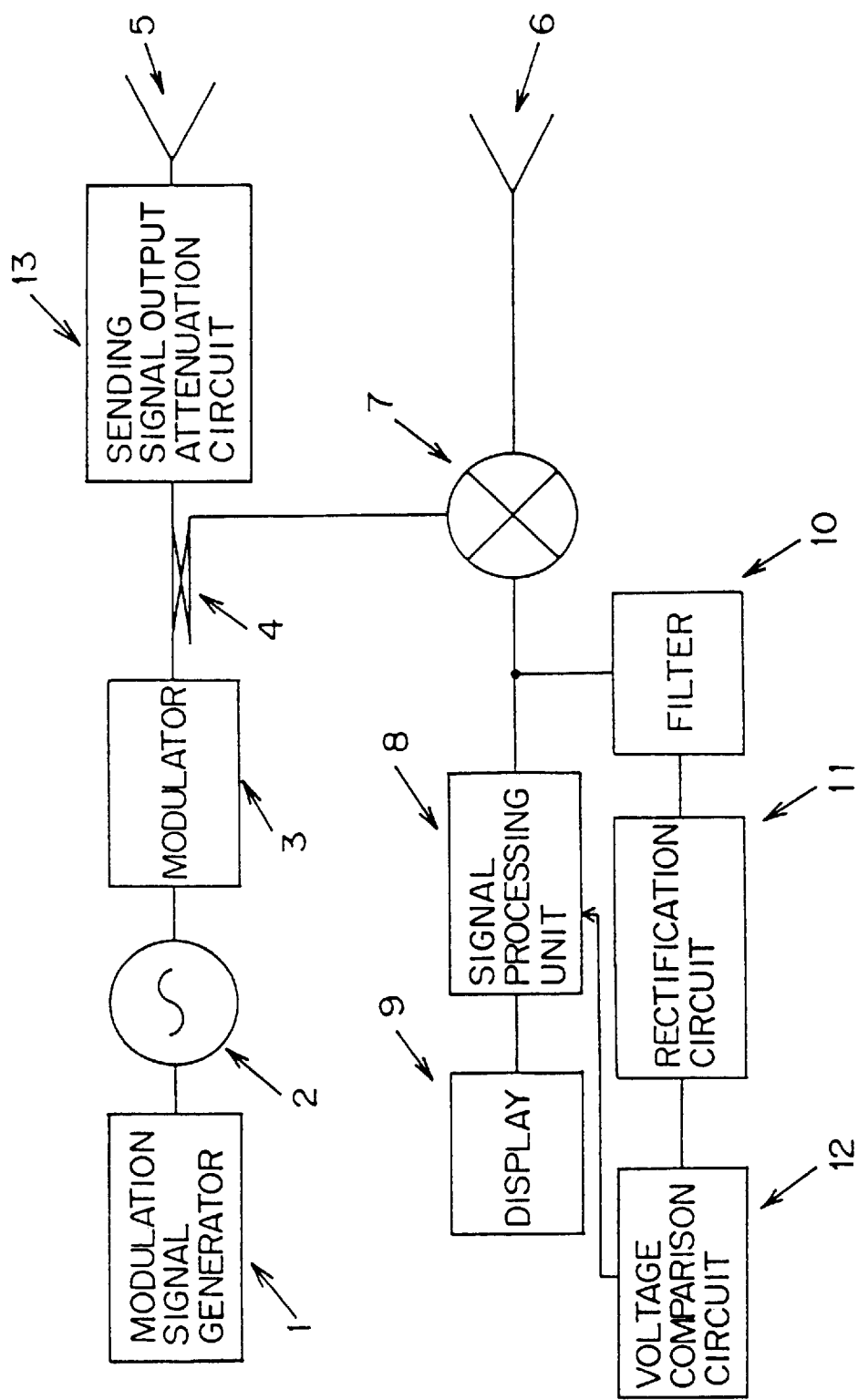
FIG. 5 is a block diagram of the principle of the second embodiment of the present invention.

FIG. 5 is a block diagram of the principle of the second embodiment of the present invention.

In the radar apparatus relating to the above described second embodiment of the present invention, shown in FIG. 5, a sending signal output attenuation circuit 13 is installed between the directional coupler 4 and the sending antenna 5 which are component of the first embodiment of the present invention as shown in FIG. 4. The sending signal output attenuation circuit 13 corresponds to the sending signal output attenuation circuit recited in claims 3–5.

By realizing the above described second embodiment of the present invention, the sending signal output can be attenuated when a failure determination mode is chosen, so that influences external to the radar system can be attenuated.

Figure 6:
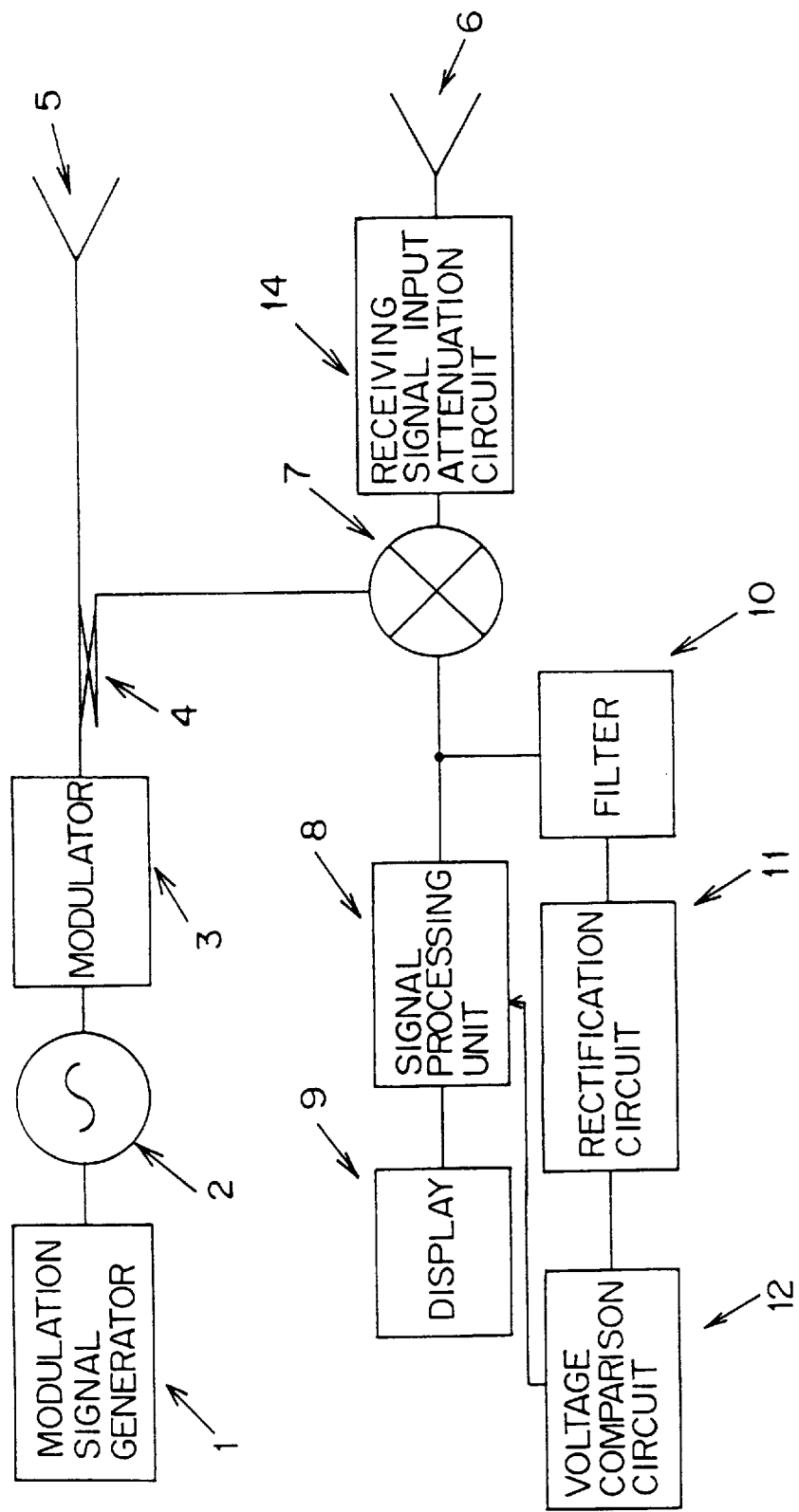
FIG. 6 is a block diagram of the principle of the third embodiment of the present invention.

FIG. 6 is a block diagram of the third embodiment of the present invention.

In the radar apparatus relating to the third embodiment of the present invention, a receiving signal input attenuation circuit 14 is installed between the receiving antenna 6 and the frequency convertor 7 in the first embodiment of the present invention shown in FIG. 4. The receiving signal input attenuation circuit 14 corresponds to the receiving signal input attenuation circuit recited in claims 6–8.

By realizing the above described third embodiment of the present invention, the received signal is able to be attenuated when the failure determination mode is chosen, then the influences external to the radar are able to be attenuated.

Figure 7:
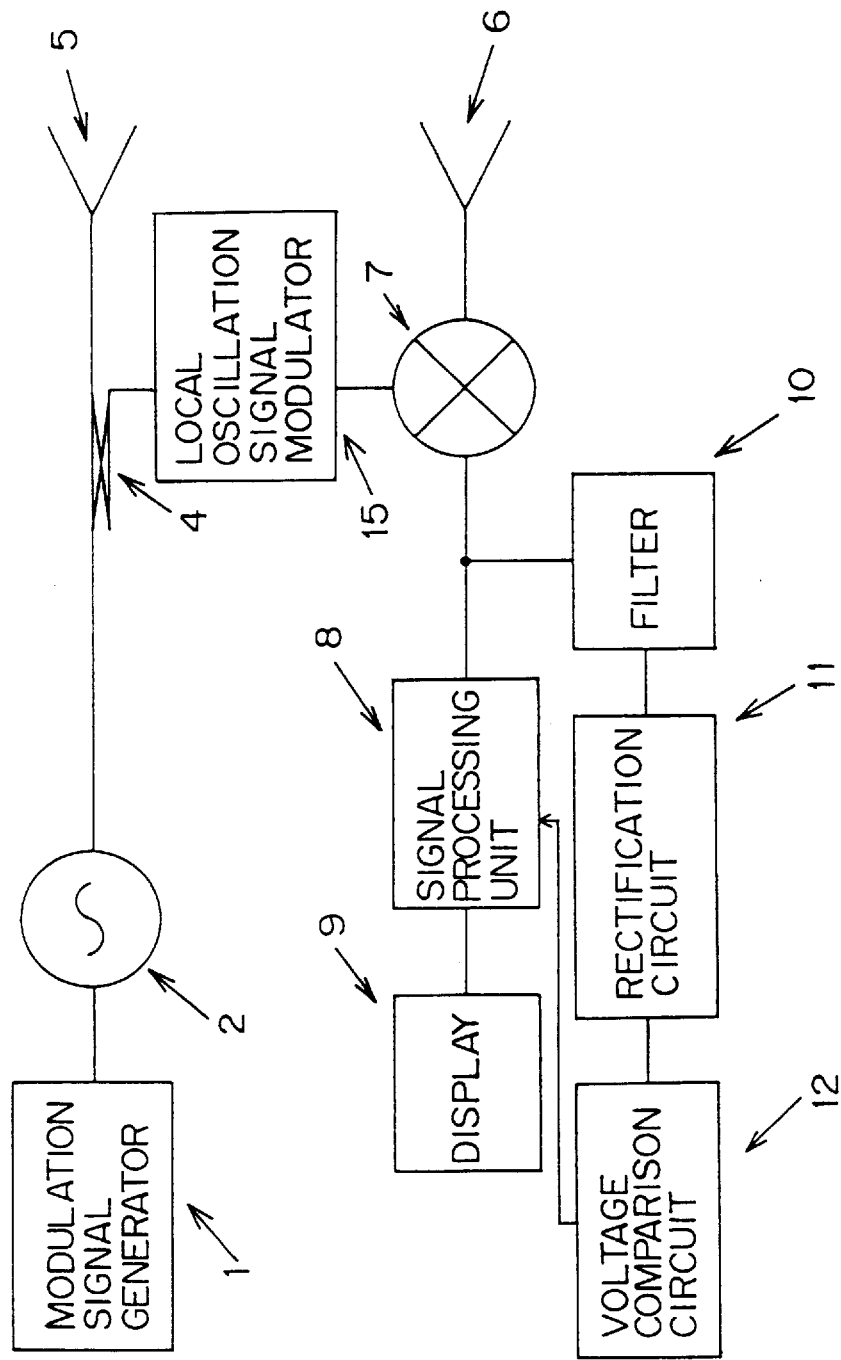
FIG. 7 is a block diagram of the principle of the fourth embodiment of the present invention.

FIG. 7 is a block diagram of the fourth embodiment of the present invention.

In the radar apparatus relating to the fourth embodiment of the present invention as shown in FIG. 7, a local oscillation signal modulator 15 is installed between the directional coupler 4 and the frequency convertor 7, in place of the modulator 3, in the first embodiment of the present invention as shown in FIG. 4. The local oscillation signal modulator 15 corresponds to the local oscillation signal modulator recited in claim 9. Then, the local oscillation signal is modulated by the local oscillation signal modulator 15 when the failure determination mode is chosen.

Figure 8:
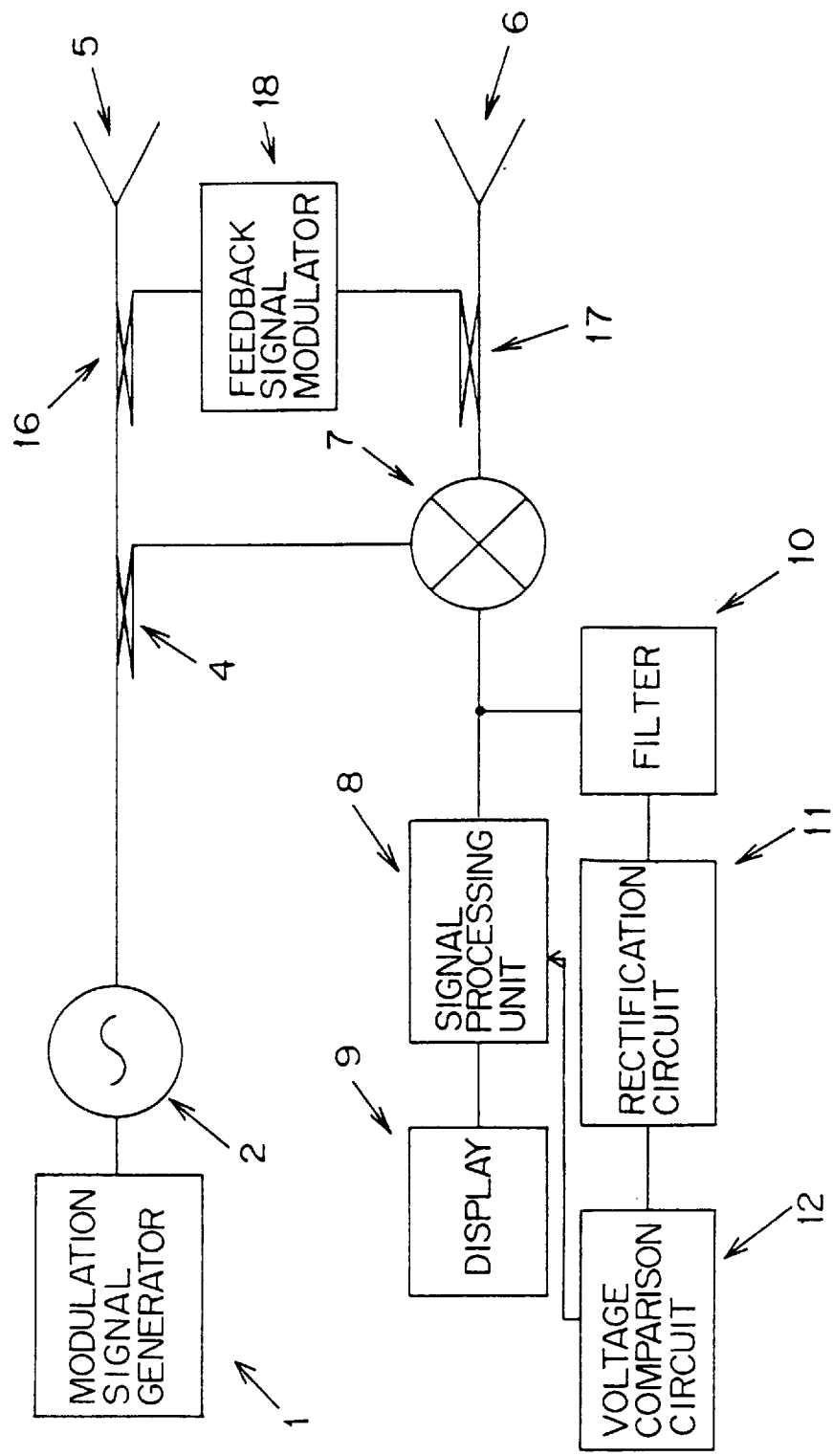
FIG. 8 is a block diagram of the principle of the fifth embodiment of the present invention.

FIG. 8 is a block diagram of the fifth embodiment of the present invention.

In the fifth embodiment of the present invention, a feedback path, in which the sending signal after being split by the directional coupler 4 is further split by a directional coupler 16 and mixed with the reflected signal received from the directional coupler 17, is formed. A feedback signal modulator 18 is installed in that feedback path. Here, the directional couplers 16 and 17 correspond to the feedback loop circuit recited in claim 10, and the feedback signal modulator 18 corresponds to the feedback signal modulator recited in claim 10.

As described in the above first through fifth embodiments of the present invention, the modulated frequency of the signal for operation of the failure determination mode, is able to be set in such a way that it is a different frequency from the modulated frequency of the frequency modulation used to generate the sending signal.

Further, in the first through fifth embodiments of the present invention, the frequency modulation or the phase modulation other than the amplitude modulation, is able to be used as a signal modulation method for the failure determination. The amplitude modulation is able to be realized by changing the gain of an amplifier, for example, or switching the signal.

<Detailed Description of the Preferred Embodiment of the Present Invention>

Here, the preferred embodiment of the present invention based on the above described principle is explained in detail by referring to the figures.

The first preferred embodiment

Figure 9:
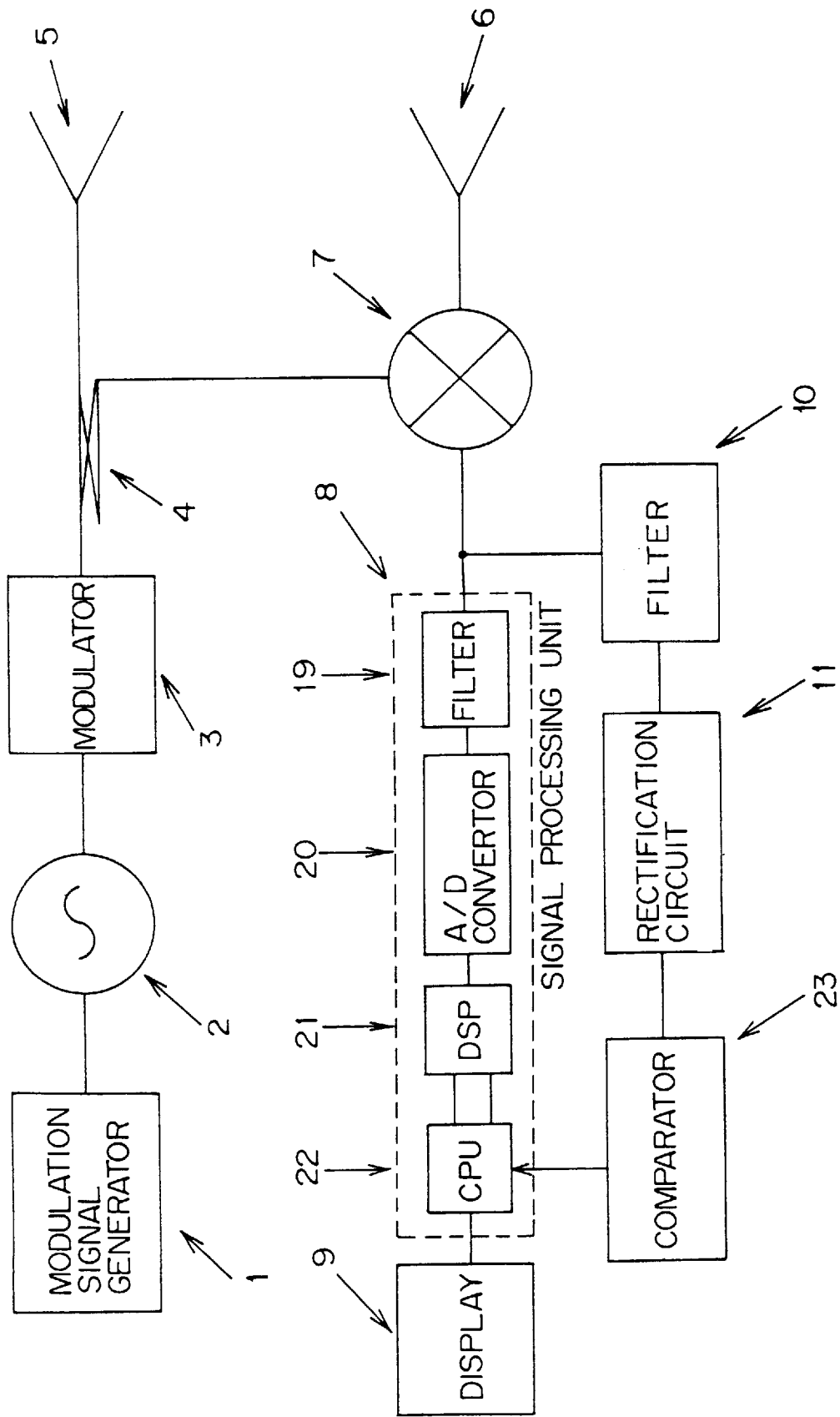
FIG. 9 is a block diagram of the first preferred embodiment of the present invention.

FIG. 9 is a block diagram of the first preferred embodiment of the present invention.

The FM-CW radar apparatus shown in FIG. 9 includes the modulation signal generator 1, the voltage controlled oscillator 2, the modulator 3, the directional coupler 4, and the sending antenna 5 as a sending system, the receiving antenna 6 and the frequency convertor 7 as a receiving system, and the signal processing unit 8 (comprising the filter 19, A/D convertor 20, DSP 21, and CPU 22), the display 9, the filter 10, the rectification circuit 11, and the comparator 23 as a signal processing system.

Figure 1:
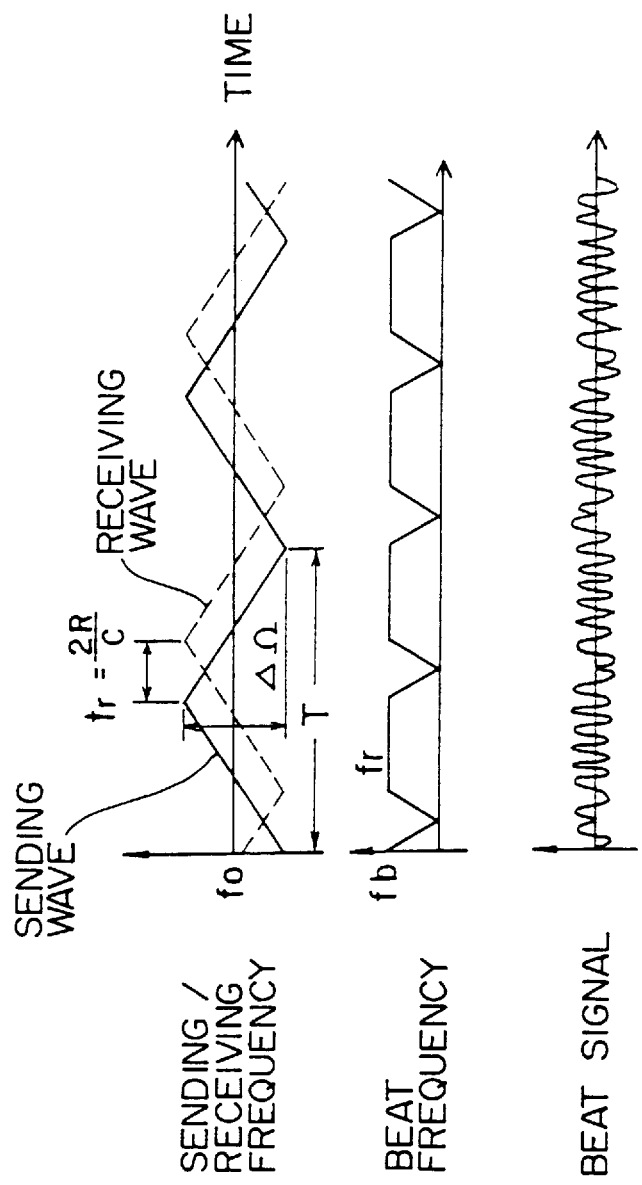
FIG. 1 illustrates a principle of an FM-CW radar apparatus.
Figure 2:
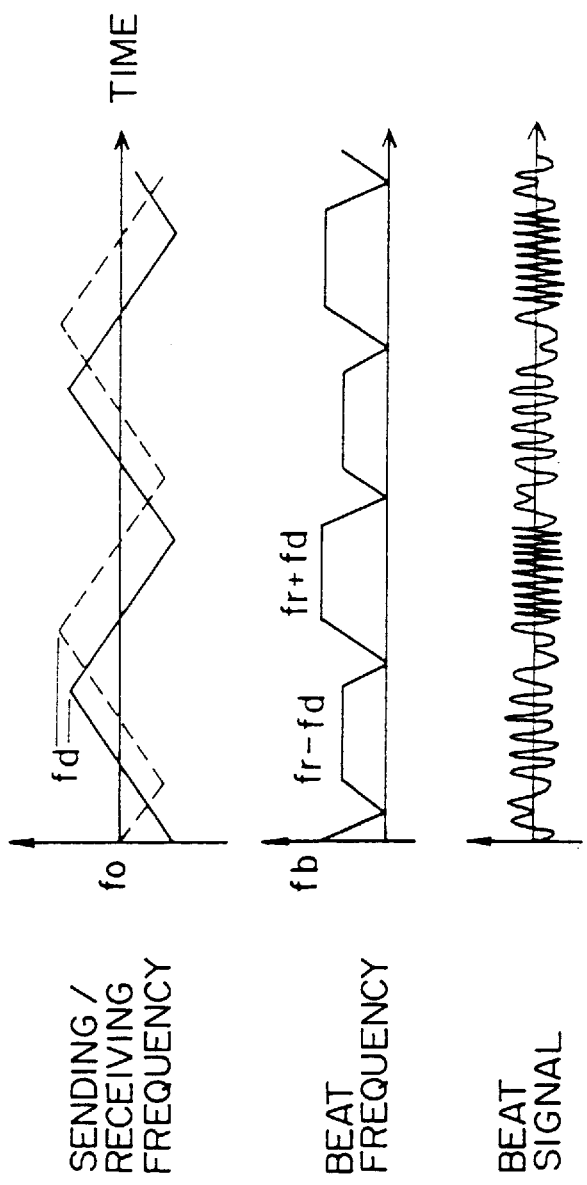
FIG. 2 illustrates a principle of the FM-CW radar apparatus.
Figure 3:
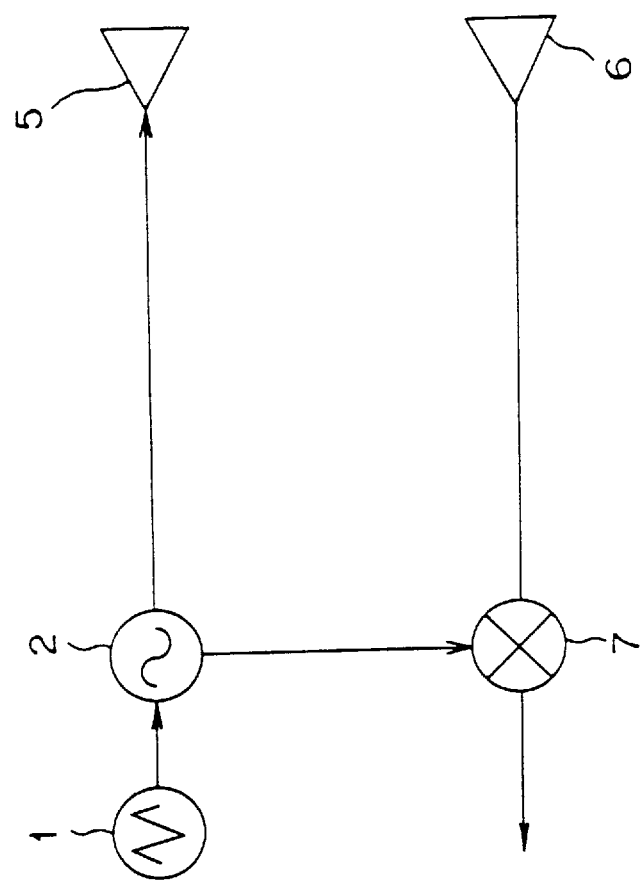
FIG. 3 is a block diagram of a conventional FM-CW radar apparatus.

Here, the modulation signal generator 1 generates the sawtooth wave signal for frequency modulation. The voltage controlled oscillator 2 generates the frequency-modulated signal of the millimeter wave band for the radar output. The modulator 3 generates the signal for the failure detection. The directional coupler 4 receives the millimeter wave signal from the modulator 3 as the local oscillation signal for the sending antenna 5 and the frequency convertor 7. The sending antenna 5 effectively radiates the signal output from the directional coupler 4. The receiving antenna 6 effectively receives the signal reflected from the target object. The frequency convertor 7 mixes the local oscillation signal from the directional coupler 4 with the signal received from the receiving antenna 6, generates the signal elements containing the relative speed and the distance information between the target object and the radar apparatus, and in addition generates the failure detection signal. The signal processing unit 8 detects the relative speed and the distance information from the signal elements output from the frequency convertor 7, and outputs the data necessary for display to the display 9. In this signal processing unit 8, the filter 19 extracts only the beat frequency element (as shown in FIGS. 1 and 2). A/D convertor 20 converts an analog output signal from the filter 19 into a digital signal. DSP 21 extracts the beat frequency element by operating an FFT (Fast Fourier Transformation) analysis for the digital signal output from the A/D convertor 20, and calculates the distance and the relative speed based on the aforementioned equation (1). CPU 22 operates failure detection processing by monitoring the output from the comparator 23, and data display processing for the display 9. Next, the display 9 displays the display data output from the signal processing unit 8. The filter 10 filters the signal element necessary for the failure detection among the signal elements output from the frequency convertor 7. The rectification circuit 11 converts an alternating current signal from the filter 10 into a direct current signal. The comparator 23 compares the failure detection signal output from the rectification circuit 11 with a reference signal previously set.

The FM-CW radar apparatus comprising the above described elements operates as follows.

The sawtooth wave generated in the modulation signal generator 1 is input to the voltage controlled oscillator 2 in order to generate the frequency modulated wave. The output wave form of the generated signal wave is represented by the following equation $$A \sin [\Omega_t t + \int s(t)dt] \quad (2)$$

where, "A" is amplitude, $\Omega$, $=2\pi f_0$, and integral part $\int s(t)dt$ is a sawtooth modulation element.

Further, this signal is modulated by the modulator 3. If the modulating method is AM modulation, the output signal from the modulator 3 is represented by the following equation $$A(1+B) \sin [\Omega_t t + \int s(t)dt] \quad (3)$$

where, (1+B) is an AM modulation element, and the modulated frequency is approximately 500 KHz (Kilo Hertz) to 1 MHz (Mega Hertz).

This signal is input to the frequency convertor 7 as the local oscillation signal from the directional coupler 4. Now, if there is no reflected wave from the target object, as a simple case for explanation, the output signal from the frequency convertor 7 is represented by the following equation, if the signal represented by the equation (3) is square-law-detected by the frequency convertor 7

$$\{A(1+B)\sin[\omega_t t + \int s(t)dt]\}^2 = A^2(1+B)^2\sin^2[\omega_t t + \int s(t)dt] = \quad (4)$$

$$A^2\sin^2[\omega_t t + \int s(t)dt] + A^2B^2\sin^2[\omega_t t + \int s(t)dt] + 2A^2B\sin^2[\omega_t t + \int s(t)dt]$$

where, only the element Sdet, which is shown in the following equation, is passed by the filter 10 as the signal, as only the signal element, whose frequency is approximately the same as one of the frequency element B, passes.

$$Sdet = 2A^2B \sin^2 [\Omega, t + \int s(t)dt] \quad (5)$$

After the rectification circuit 11 converts this signal Sdet into a direct current signal and the comparator 23 compares this signal with the reference voltage, it becomes possible to detect whether or not a failure situation exists. Here, the reference voltage is set to be a value where a seasonal change and a temperature change are added to a value of a direct current signal generated when the radar apparatus operates correctly. To give an actual example, CPU 22 determines that the radar apparatus is operating abnormally when the comparator 23 detects that the voltage of the direct current signal output from the rectification circuit 11 is lower than the reference voltage. Now, for example, the voltage of the direct current signal output from the rectification circuit 11 becomes lower, since the absolute level of the signal output from the frequency convertor 7 becomes lower as a whole when the conversion loss is increased in the frequency convertor 7. Further, the voltage of the direct current signal output from the rectification circuit 11 also becomes lower, since the input level of the signal input into the frequency convertor 7 from the directional coupler 4 becomes lower when the output voltage of the modulation signal generator 1 becomes lower. Therefore, the lower voltage of the direct current signal output from the rectification circuit 11 shows that the sensitivity of the signal has deteriorated in the high frequency circuit, in either the receiving side or the sending side of the radar apparatus. This indicates that the limitation in the detected distance of the vehicle ahead becomes shorter. The implication of a reduction in the limitation of the detected distance of the vehicle ahead is such that a warning normally made when the distance of the car ahead becomes 100 m, for example, is now changed to the situation in which the warning will only be made when the distance of the car ahead becomes 60 m.

Figure 10:
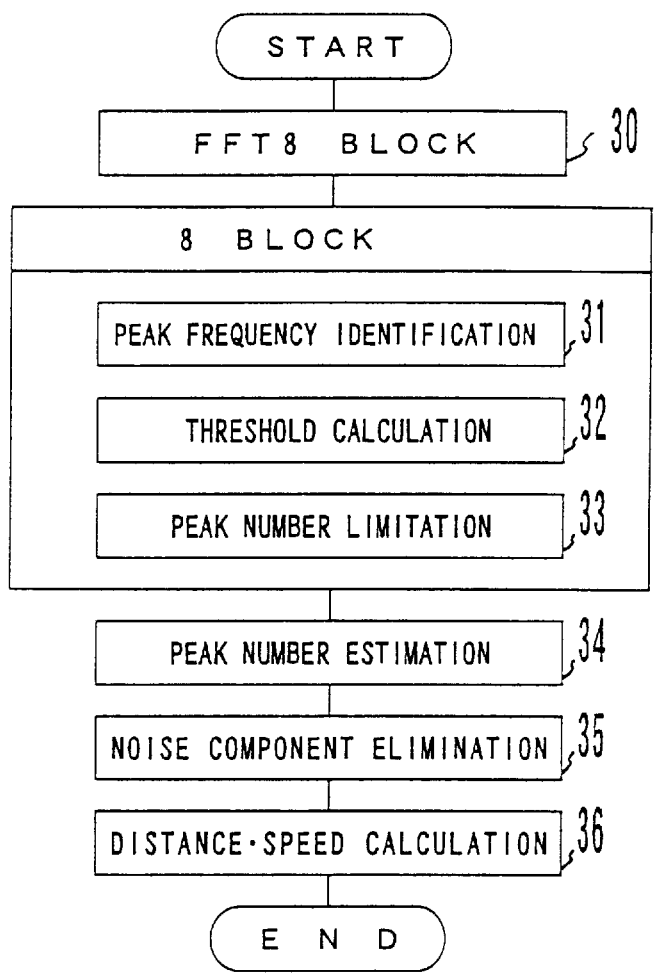
FIG. 10 is an operating flowchart showing DSP (Digital Signal Processor) processing of the present invention.

FIG. 10 is an operating flowchart showing the processing of DSP 21. DSP 21 operates the FFT (Fast Fourier Transformation) analysis for the digital signal output from A/D convertor 20 (step 30 in FIG. 10). DSP 21 identifies the peak frequency for the FFT frequency output (step 31). Then, DSP 21 limits the number of the peaks to be used (step 33) by calculating a threshold value for the level of the peak frequency (step 32). Next, DSP 21 estimates the number of the available peaks (step 34), filters the noise elements among the extracted peak elements (step 35) and finally calculates the distance frequency fr and the speed frequency fd by extracting the two beat frequency elements fb=(the distance frequency fr depending on the distance)±(the speed frequency fd depending on the speed) from the peaks which are left, and calculates the distance R and the relative speed v based on the aforementioned equation (1) (step 36). The process is then terminated.

FIG. 11 is an operating flowchart showing the processing in CPU 22. CPU 22 sets the current mode to be the failure detection mode (step 40 in FIG. 11). The setting timing in which the current mode is set to be the failure detection mode is the timing at which a vehicle engine has just been started, or when the radar apparatus has just been switched on. Next, CPU 22 monitors the output voltage of the comparator 23 (step 41), and determines whether or not a failure has occurred by determining whether or not the output voltage of the comparator 23 is lower than the reference voltage (step 42). CPU 22 displays the failure on the display 9 if it determines that a failure has occurred (step 43). On the other hand, it changes the failure detection mode to the radar measurement mode (step 44) if it determines that a failure has not occurred, and sets DSP 21 to measure the distance and relative speed (step 45). As a result, the distance and the relative speed calculated by DSP 21 are displayed on the display 9 (step 46).

By the above described first preferred embodiment of the present invention, abnormal working or a performance deterioration based on the characteristic deterioration of the high frequency circuits can be detected before the function of the FM-CW radar apparatus fails completely.

The second preferred embodiment

Figure 12:
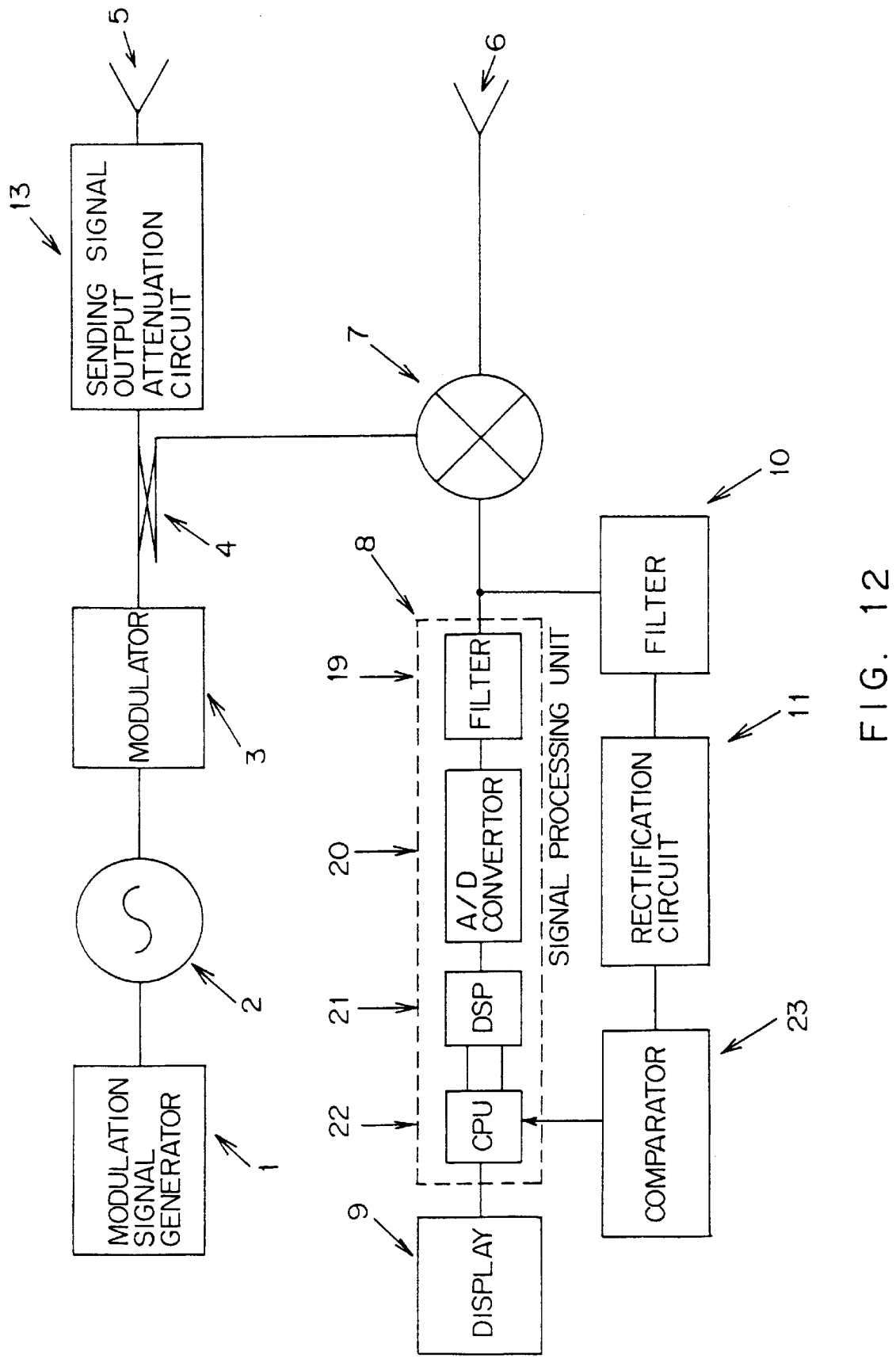
FIG. 12 is a block diagram of the second preferred embodiment of the present invention.

FIG. 12 is a block diagram of the second preferred embodiment of the present invention. Items with same reference number as those in FIG. 9 have the same function and their description is omitted here.

In the second preferred embodiment, a sending signal output attenuation circuit 13 is installed between the directional coupler 4 and the sending antenna 5 in order to prevent output of the sending signal. According to the structure of this embodiment, the receiving of the signal resulting from the reflected wave from the target object is prevented no matter how close the target object becomes to the radar apparatus.

As shown in this structure, according to the second preferred embodiment, the same effect for the failure signal detection, etc., as the aforementioned first embodiment is realized based on the same principle as the aforementioned first preferred embodiment, although the sending signal output attenuation circuit 13 is installed in the sending system.

The third preferred embodiment

Figure 13:
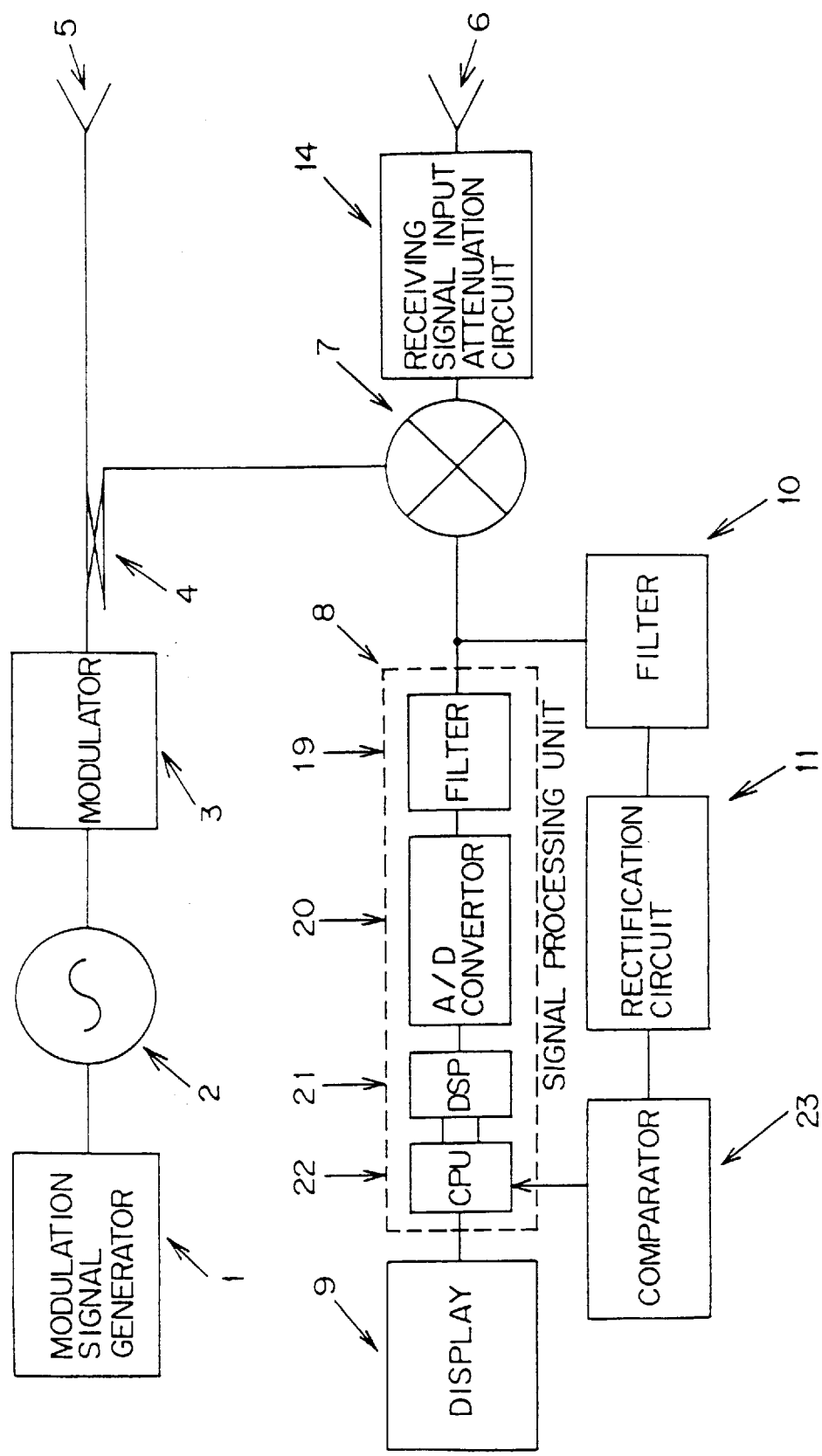
FIG. 13 is a block diagram of the third preferred embodiment of the present invention.

FIG. 13 is a block diagram of the third preferred embodiment of the present invention. Items with the same reference number as those in FIG. 9 have the same function and their description is omitted here.

In the third preferred embodiment, a receiving signal input attenuation circuit 14 is installed between the receiving antenna 6 and the frequency convertor 7 in order to prevent the output of the receiving signal. According to the structure of this embodiment, the signal resulting from the reflected wave from the target object is prevented no matter how close the target object becomes to the radar apparatus.

As shown in this structure according to the third preferred embodiment, the same effect for the failure signal detection, etc., as the aforementioned first preferred embodiment can be realized based on the same principle as the aforementioned first preferred embodiment, although the receiving signal input attenuation circuit 14 is installed in the receiving system.

The fourth preferred embodiment

Figure 14:
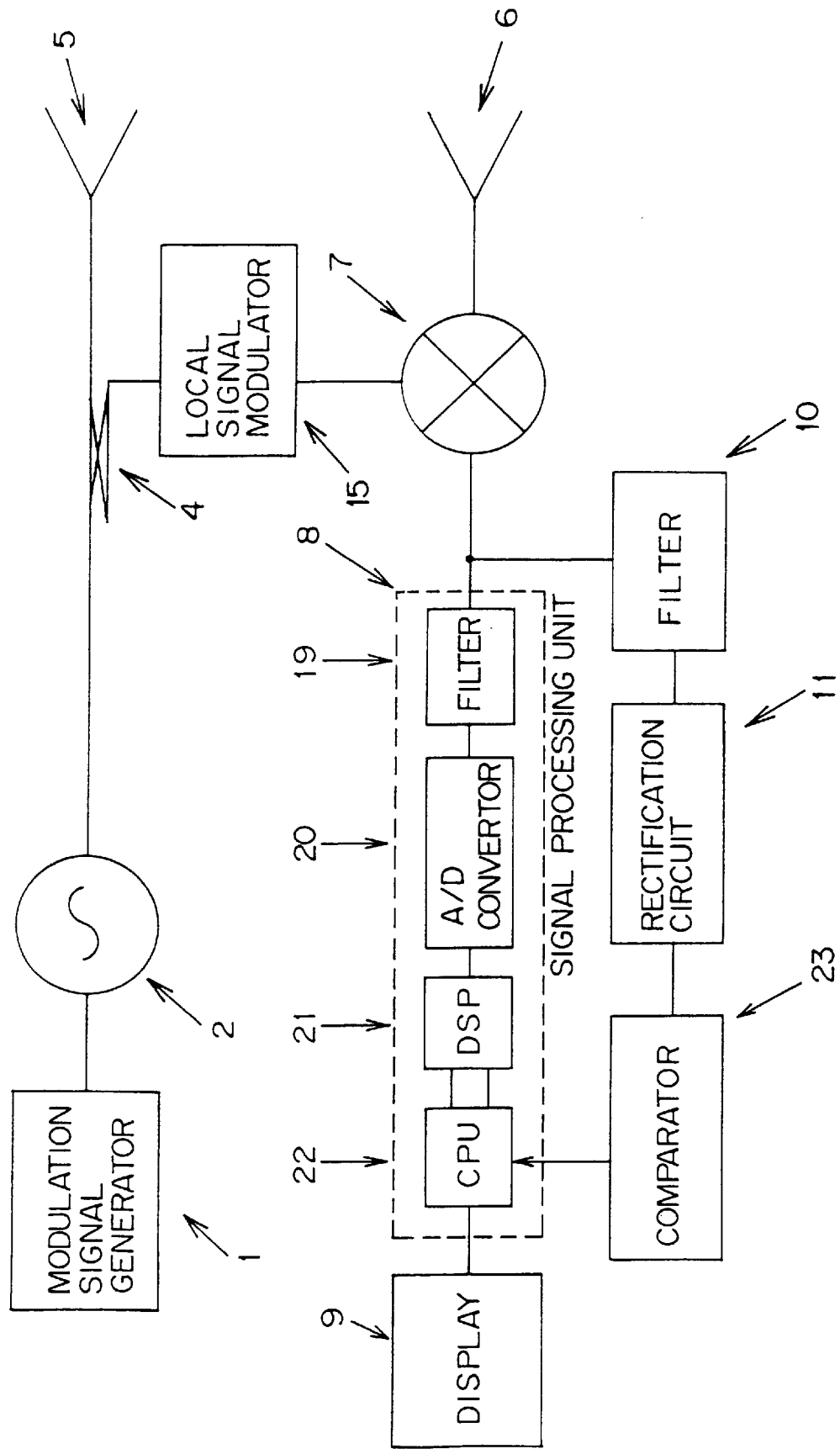
FIG. 14 is a block diagram of the fourth preferred embodiment of the present invention.

FIG. 14 is a block diagram of the fourth preferred embodiment of the present invention. Items with the same reference number as those in FIG. 9 have the same function and their description is omitted here.

In the fourth preferred embodiment, a local signal modulator 15 is installed between the directional coupler 4 in the sending system and the frequency convertor 7 in the receiving system. According to this structure, only the local signal can be modulated by using the failure determination modulating signal.

As shown in this structure according to the fourth preferred embodiment, the same effect for the failure signal detection, etc., as the aforementioned first preferred embodiment can be realized based on the principle of the aforementioned first preferred embodiment, although the local signal modulator 15 is included in the local system.

The fifth preferred embodiment

Figure 15:
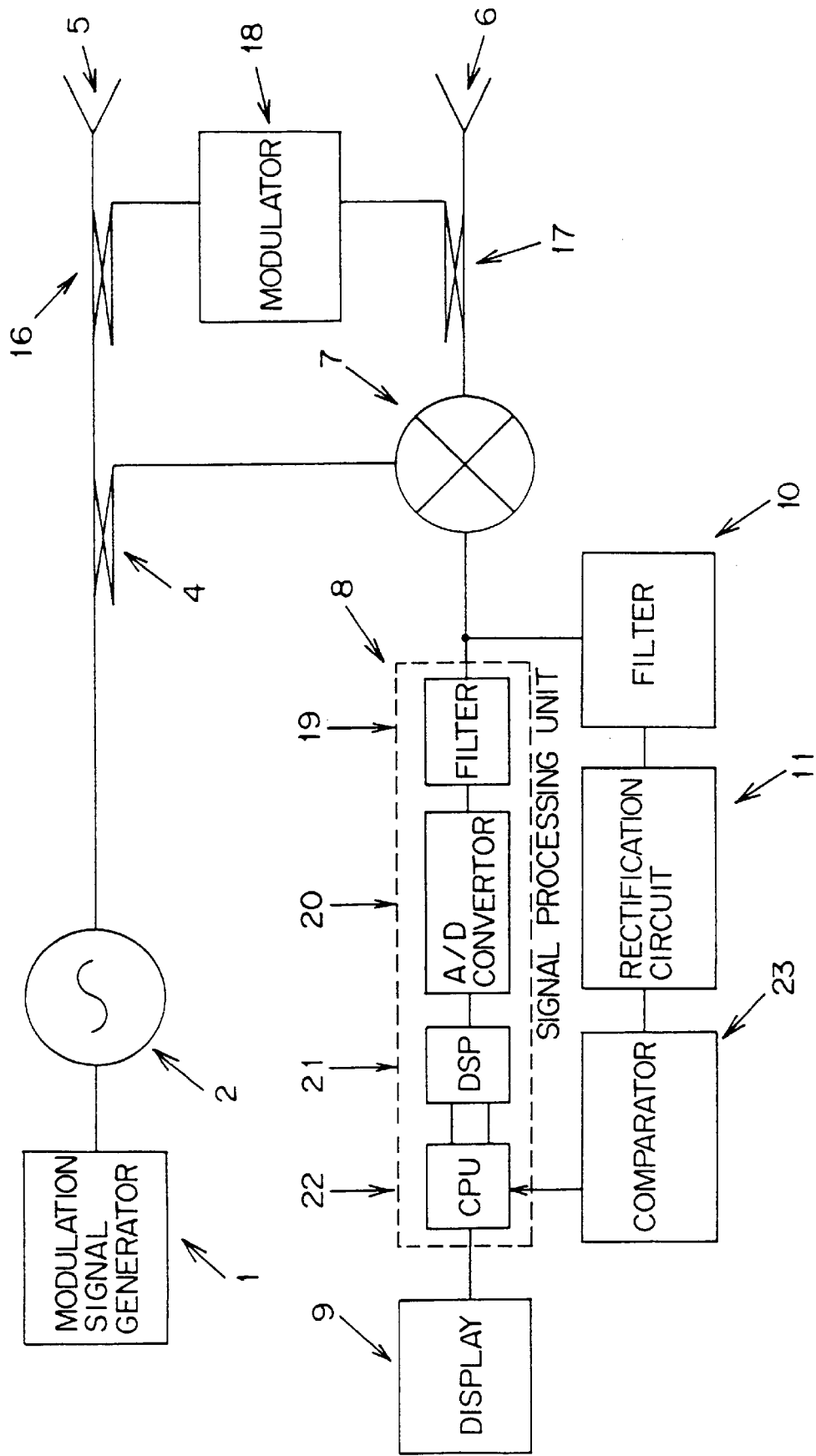
FIG. 15 is a block diagram of the fifth preferred embodiment of the present invention.

FIG. 15 is a block diagram of the fifth preferred embodiment of the present invention. Items with the same reference number as those in FIG. 9 have the same function and their description is omitted here.

In the fifth preferred embodiment, a feedback loop for the failure detection is formed by the directional coupler 16 which is installed between the directional coupler 4 and the sending antenna 5, and the directional coupler 17 which is installed between the receiving antenna 6 and the frequency convertor 7. The signal is able to be modulated by the failure detection signal by installing the feedback signal modulator 18 in this feedback loop.

As shown in this structure, according to the fifth preferred embodiment, the same effect for the failure signal detection, etc., as the aforementioned first preferred embodiment can be realized based on the same principle as the aforementioned first preferred embodiment, although the feedback loop for the failure detection comprising the directional coupler 16, the directional coupler 17, and the feedback signal modulator 18 are included between the sending system and receiving system.

The sixth preferred embodiment

Figure 16:
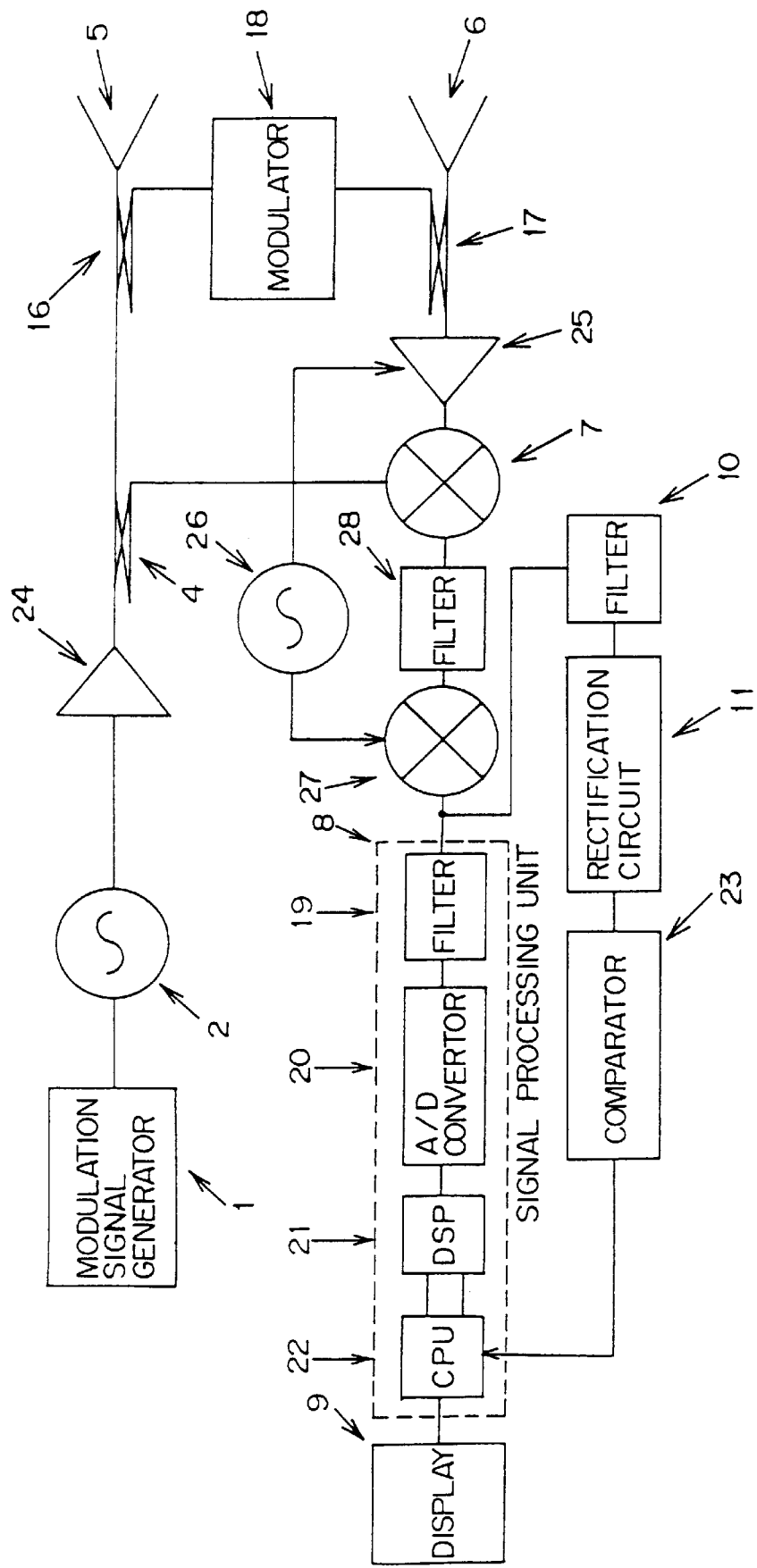
FIG. 16 is a block diagram of the sixth preferred embodiment of the present invention.

FIG. 16 is a block diagram of the preferred embodiment to which the present invention is applied in the FM-CW radar apparatus (Tokkaihei 5-040169) the present applicant applied previously. Items with the same reference number as those in FIG. 9 have the same function and their description is omitted here.

In the sixth preferred embodiment, a heterodyne type FM-CW radar apparatus is formed by installng the sending signal amplifier 24 between the voltage controlled oscillator 2 and the directional coupler 4, the receiving signal amplifier 25 between the directional coupler 17 and the frequency convertor 7, the filter 28 and the second frequency convertor 27 between the frequency convertor 7 and the signal processing unit 8, and the switching signal source 26. Namely, in the sixth preferred embodiment, the signal which is converted to an intermediate frequency element by the second frequency convertor 27 is input to the signal processing unit 8 after only the frequency element corresponding to the beat frequency has been passed by the filter 28. Thus, the embodiment provides better reduction of noise than the conventional technologies.

As shown in this structure, according to the sixth preferred embodiment, the same effect for the failure signal detection, etc., as the aforementioned first preferred embodiment can be realized based on the same principle as the aforementioned fifth preferred embodiment, although the FM-CW radar apparatus forms a heterodyne type of embodiment by installing the sending signal amplifier 24 between the voltage controlled oscillator 2 and the directional coupler 4, the receiving signal amplifier 25 between the directional coupler 17 and the frequency convertor 7, the filter 28 and the second frequency convertor 27 between the frequency convertor 7 and the signal processing unit 8, and the switching signal source 26.

The seventh preferred embodiment

Figure 17:
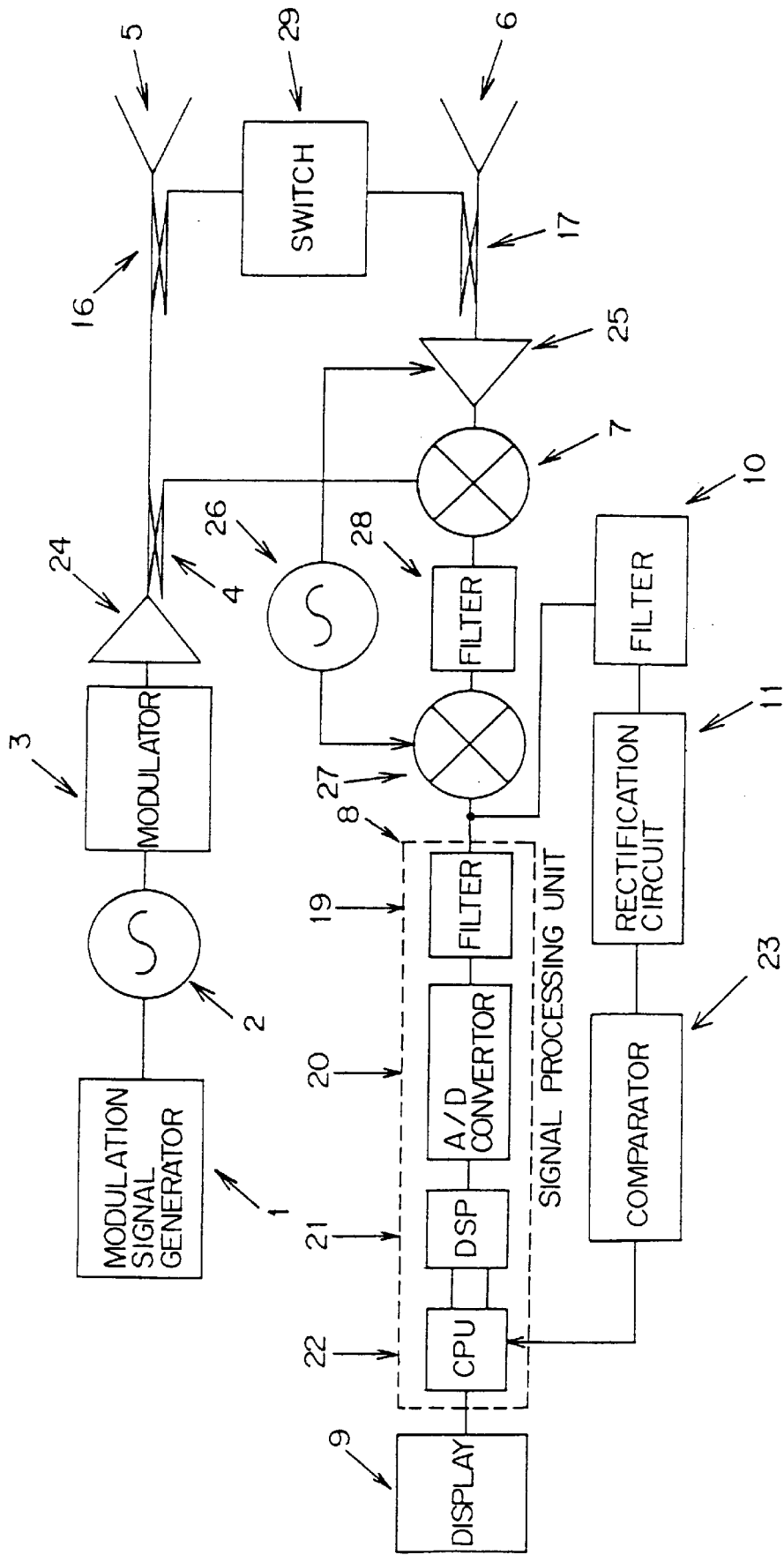
FIG. 17 is a block diagram of the seventh preferred embodiment of the present invention.

FIG. 17 shows the another preferred embodiment to which the present invention is applied in the FM-CW radar apparatus disclosed in the prior art of the Japanese Patent application: Tokkaihei 5-040169. Items with the same reference number as those in FIG. 9 have the same function and their description is omitted here.

In the seventh preferred embodiment, the heterodyne type FM-CW radar apparatus is formed in the same manner as in the sixth preferred embodiment.

As shown in this structure, according to the seventh preferred embodiment, the same effect for the failure signal detection, etc., as the aforementioned first preferred embodiment can be realized based on the same principle as the aforementioned sixth preferred embodiment, although the FM-CW radar apparatus forms the heterodyne type of embodiment by installing the sending signal amplifier 24 between the modulator 3 and the directional coupler 4, the receiving signal amplifier 25 between the directional coupler 17 and the frequency convertor 7, the second frequency convertor 27 and the filter 28 between the frequency convertor 7 and the signal processing unit 8, and the switching signal source 26.

Other preferred embodiments

Further, the failure detection frequency can be determined very easily by selecting a frequency different from the modulation frequency which is used for the distance and relative speed measurement for the radar apparatus, as the modulation frequency for the failure detection in the aforementioned respective preferred embodiments.

Further, as the modulation system, the switching circuit for switching at the rate of the failure detection frequency can be used, other than AM modulation. This switching circuit can be considered as a special case of AM modulation because the amplitude is modulated to either 1 or 0. When the switching circuit is used, a PIN (Positive Intrinsic Negative) diode is used, for example, or three-terminal devices such as GaAs, MESFET (Metal-Semiconductor FET) or HEMT (High Electron Mobility Transistor) are used by switching a drain current (drain voltage).

Further, in the fifth preferred embodiment, a frequency modulator or a phase modulator can be used as the feedback signal modulator 18.

Further, in order to attenuate the sending signal output or the receiving signal input, a gain attenuator or a switching circuit can be used.

When the embodiment is formed, in which the failure detection timing is separated from the distance and relative speed detection timing, the filter 19, A/D convertor 20, and DSP 21 can be used functionally to replace the filter 10, the rectification circuit 11, and the comparator 23, respectively.

Figure 18:
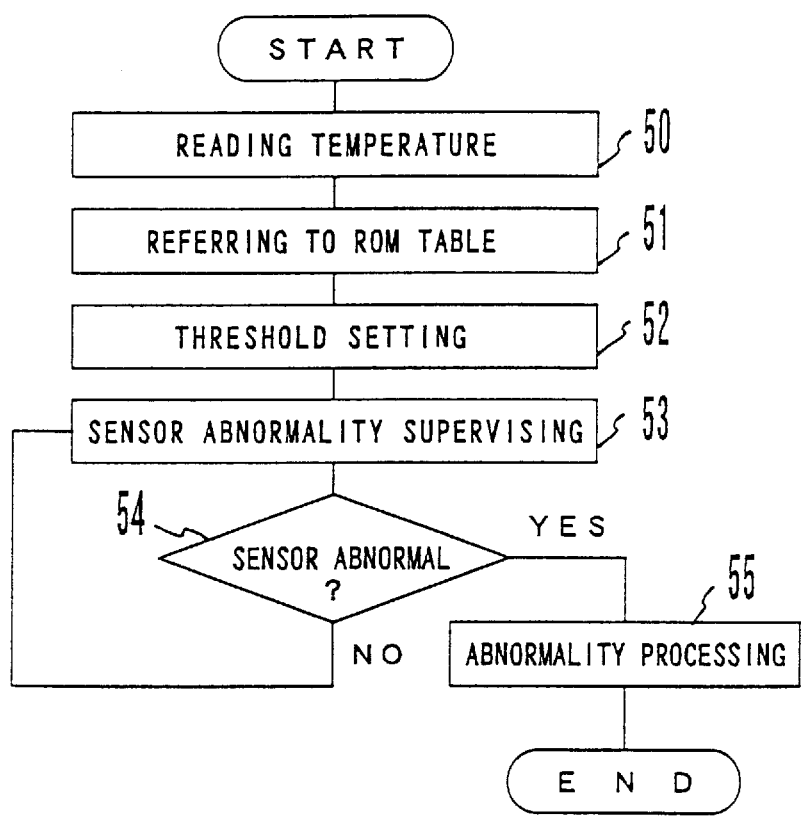
FIG. 18 is an operating flowchart showing a determination logic of the CPU for a temperature change of the present invention.

Further, the aforementioned each preferred embodiment can be formed having a temperature information function, because the reference voltage of the comparator 23 may be changed by a temperature change. FIG. 18 is an operating flowchart showing a determination logic process of CPU 22 for a temperature change, when that embodiment is applied. In this figure, CPU 22 obtains a temperature value that a designated temperature sensor has detected (step 50 in FIG. 18). Next, it reads a threshold voltage corresponding to the detected temperature from the designated ROM (Read Only Memory) table (step 51). The obtained value is set as the reference voltage of the comparator 23 (step 52). CPU 22 monitors the sensor (step 53). The abnormality processing is executed if an abnormality of the sensor is detected (steps 54 and 55).

Here, an embodiment can be formed in which the comparator 23 is made dependent directly on temperature by using a thermistor.

What is claimed is:

1. A failure determination device included in a radar apparatus, the radar apparatus for outputting a high frequency signal frequency-modulated by a modulation signal, receiving a reflected signal back from a target object, and converting the received reflected signal by using a signal which is obtained by splitting a part of a sending signal to be a local oscillation signal for a receiver, comprising:

a feedback loop circuit for further splitting the sending signal after previously splitting and mixing the further split feedback signal with the received reflected signal;

a feedback signal modulator for modulating the feedback signal in the feedback loop circuit;

a detection circuit for detecting modulated elements originated from the feedback signal modulator from the converted signal;

a failure determination circuit for determining whether or not a failure has occurred, based on the modulated elements detected by the detection circuit, by comparing the detected modulated elements with a preset reference level.

2. A failure determination device included in a radar apparatus, the radar apparatus for outputting a high frequency signal frequency-modulated by a modulation signal, receiving a reflected signal back from a target object, and converting the received reflected signal by using a signal which is obtained by splitting a part of a sending signal to be a local oscillation signal for a receiver, comprising:

a modulator for modulating the sending signal prior to splitting;

a detection circuit for detecting modulated elements originated in the modulator from the converted signal; and a failure determination circuit for determining whether or not a failure has occurred, based on the modulated elements detected by the detection circuit, by comparing the detected modulated elements with a preset reference level.

3. The apparatus according to claim 2, further comprising:
a sending signal output attenuation circuit for attenuating output of a sending signal after splitting.

4. The apparatus according to claim 3, wherein
said sending signal output attenuation circuit attenuates the output of said sending signal by attenuating a gain of a sending signal amplifier which amplifies said sending signal.

5. The apparatus according to claim 3, wherein
said sending signal output attenuation circuit is a switching circuit which makes it possible to operate selectively the output of said sending signal by an on/off switching process.

6. The apparatus according to claim 2, further comprising:
a receiving signal input attenuation circuit for attenuating the input of the reflected signal which is modulated by a frequency.

7. The apparatus according to claim 6, wherein
said receiving signal input attenuation circuit attenuates the input of said receiving signal by attenuating a gain of a receiving signal amplifier which amplifies said receiving signal.

8. The apparatus according to claim 6, wherein
said receiving signal input attenuation circuit is a switching circuit which makes it possible to operate selectively the input of said receiving signal by an on/off switching process.

9. A failure determination device included in a radar apparatus, the radar apparatus for outputting a high frequency signal frequency-modulated by a modulation signal, receiving a reflected signal back from a target object, and converting the received reflected signal by using a signal which is obtained by splitting a part of a sending signal to be a local oscillation signal for a receiver, comprising:
a local oscillation signal modulator for modulating a local oscillation signal after splitting;
a detection circuit for detecting modulated elements originated in the local oscillation signal modulator from the converted signal; and
a failure determination circuit for determining whether or not a failure has occurred, based on the modulated elements detected by the detection circuit, by comparing the detected modulated elements with a preset reference level.

10. A failure determination method included in a radar apparatus, the radar apparatus for outputting a high frequency signal frequency-modulated by a modulation signal, receiving a reflected signal back from a target object, and converting the received reflected signal by using a signal which is obtained by splitting a part of a sending signal to be a local oscillation signal for a receiver, comprising steps of:
modulating the sending signal prior to splitting;
detecting modulated elements which originated in the modulation from the converted signal; and
determining whether or not a failure has occurred, based on the modulated elements detected, by comparing the detected modulated elements with a preset reference level.

11. A failure determination method included in a radar apparatus, the radar apparatus for outputting a high frequency signal frequency-modulated by a modulation signal, receiving a reflected signal back from a target object, and converting the received rejected signal by using a signal which is obtained by splitting a part of a sending signal to be a local oscillation signal for a receiver, comprising steps of:
modulating a local oscillation signal after splitting;
detecting modulated elements which originated in the local oscillation signal modulation from the converted signal; and
determining whether or not a failure has occurred, based on the modulated elements detected, by comparing the detected modulated elements with a preset reference level.

12. A failure determination method included in a radar apparatus, the radar apparatus for outputting a high frequency signal frequency-modulated by a modulation signal, receiving a reflected signal back from a target object, and converting the received reflected signal by using a signal which is obtained by splitting a part of a sending signal to be a local oscillation signal for a receiver, comprising steps of:
further splitting the sending signal after precious splitting and mixing the further split feedback signal with the received reflected signal;
modulating the split feedback signal;
detecting modulated elements which originated in the modulation from the converted signal;
determining whether or not a failure has occurred, based on the modulated elements detected, by comparing the detected modulated elements with a preset reference level.

13. The apparatus according to claim 2, wherein
a modulation frequency for said modulator differs from a modulation frequency which is used for modulating said high frequency signal by said modulation signal in order to generate said sending signal.

14. The apparatus according to claim 2, wherein
a modulation for said modulator is an amplitude modulation.

15. The apparatus according to claim 9, wherein
a modulation frequency for said local oscillation signal modulator differs from a modulation frequency which is used for modulating said high frequency signal by said modulation signal in order to generate said sending signal.

16. The apparatus according to claim 9, wherein
a modulation for said local oscillation signal modulator is an amplitude modulation.

17. The apparatus according to claim 1, wherein
a modulation frequency for said feedback signal modulator differs from a modulation frequency which is used for modulating said high frequency signal by said modulation signal in order to generate said sending signal.

18. The apparatus according to claim 1, wherein
a modulation for said feedback signal modulator is a amplitude modulation.

19. The apparatus according to claim 14, wherein
said modulator operates as an amplitude modulator by changing a gain of an amplifier.

20. The apparatus according to claim 14, wherein
said modulator operates as an amplitude modulator by switching a signal.

21. The apparatus according to claim 2, wherein a modulation for said modulator is a frequency modulation.

22. The apparatus according to claim 2, wherein a modulation for said modulator is a phase modulation.

23. The apparatus according to claim 16, wherein said local oscillation signal modulator operates as an amplitude modulator by changing a gain of an amplifier.

24. The apparatus according to claim 16, wherein said local oscillation signal modulator operates as an amplitude modulator by switching a signal.

25. The apparatus according to claim 9, wherein a modulation for said local oscillation signal modulator is a frequency modulation.

26. The apparatus according to claim 9, wherein a modulation for said local oscillation signal modulator is a phase modulation.

27. The apparatus according to claim 18, wherein said feedback signal modulator operates as an amplitude modulator by changing a gain of amplifier.

28. The apparatus according to claim 18, wherein said feedback signal modulator operates as an amplitude modulator by switching a signal.

29. The apparatus according to claim 1, wherein a modulation for said feedback signal modulator is a frequency modulation.

30. The apparatus according to claim 1, wherein a modulation for said feedback signal is a phase modulation.

* * * * *

UNITED STATES PATENT AND TRADEMARK OFFICE
CERTIFICATE OF CORRECTION

PATENT NO. : 5,841,393
DATED : November 24, 1998
INVENTOR(S) : Saito et al.

It is certified that error appears in the above-identified patent and that said Letters Patent is hereby corrected as shown below:

Col. 1, line 14, "particularly" should be --particularly,--;

Col. 1, second equation should be --$f_d=(2f_o/c)v$ ......... (1)--

Col. 2, line 8, "$1.33 \times 10^3$" should be --$1.33 \times 10^{-3}$--.

Col. 6, equation (2) should be
--$A \sin[\omega_r t + \int s(t)dt]$ ................. (2)--;

equation (3) should be
--$A(1+B)\sin[\omega_r t + \int s(t)dt]$ ........... (3)--.

line 45, "$\Omega$" should be --$\omega_r$--.

Signed and Sealed this

Fourth Day of January, 2000

Attest:

*Attesting Officer*  *Acting Commissioner of Patents and Trademarks*